United States Patent
Hayakawa et al.

(10) Patent No.: US 8,487,901 B2
(45) Date of Patent: Jul. 16, 2013

(54) DISPLAY DEVICE

(75) Inventors: Kouji Hayakawa, Chosei (JP); Koji Nagata, Hachioji (JP); Norio Mamba, Kawasaki (JP); Toshiyuki Kumagai, Mobara (JP); Shinji Sekiguchi, Kawasaki (JP); Kouichi Anno, Mobara (JP); Tsutomu Furuhashi, Yokohama (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 586 days.

(21) Appl. No.: 12/624,434

(22) Filed: Nov. 24, 2009

(65) Prior Publication Data

US 2010/0134440 A1 Jun. 3, 2010

(30) Foreign Application Priority Data

Nov. 26, 2008 (JP) ................................. 2008-300678

(51) Int. Cl.
*G06F 3/045* (2006.01)
(52) U.S. Cl.
USPC ................ 345/174; 345/173; 345/51; 345/93
(58) Field of Classification Search
None
See application file for complete search history.

(56) References Cited

U.S. PATENT DOCUMENTS

| 4,087,625 A | 5/1978 | Dym et al. |
| 5,113,041 A | 5/1992 | Blonder et al. |
| 7,683,544 B2 * | 3/2010 | Han ................................. 345/60 |
| 2006/0066522 A1 * | 3/2006 | Sasaki et al. ..................... 345/67 |
| 2009/0237365 A1 * | 9/2009 | Choi et al. ..................... 345/173 |
| 2009/0256821 A1 | 10/2009 | Mamba et al. |
| 2010/0020032 A1 | 1/2010 | Mamba et al. |
| 2010/0271330 A1 | 10/2010 | Philipp |

FOREIGN PATENT DOCUMENTS

| CN | 101566900 | 10/2009 |
| JP | 53-84420 | 7/1978 |
| JP | 54-160136 | 12/1979 |
| JP | 4-295915 | 10/1992 |
| JP | 2000-47808 | 2/2000 |
| JP | 2007-299409 | 11/2007 |
| KR | 10-2010-0011901 | 2/2010 |

* cited by examiner

*Primary Examiner* — Muhammad N Edun
(74) *Attorney, Agent, or Firm* — Antonelli, Terry, Stout & Kraus, LLP.

(57) ABSTRACT

The display device is provided with X electrodes XP and Y electrodes YP which cross with a first insulating layer in between and a number of Z electrodes which are electrically floating from each other with a second insulating layer in between. The Z electrodes are arranged so that each Z electrode overlaps both an adjacent X electrode and Y electrode. The pad portion of a first X electrode has such a form that the area is maximum in the vicinity of the fine wire portion of the first X electrode and the area is minimum in the vicinity of the fine wire portion of an adjacent second X electrode, and the area of the pad portion is smaller towards the direction in which the distance increases away from the vicinity of the fine wire portion of the first X electrode. A pulse signal is sequentially applied to one set of X electrodes or Y electrodes.

16 Claims, 12 Drawing Sheets

FIG. 4A

|  | XP1 | XP2 | XP3 | XP4 | XP5 | XP6 |
|---|---|---|---|---|---|---|
| YP1 | 21 | 152 | 151 | 20 | 28 | 34 |
| YP2 | 28 | 148 | 144 | 150 | 35 | 37 |
| YP3 | 35 | 31 | 40 | 42 | 22 | 32 |
| YP4 | 38 | 42 | 43 | 20 | 130 | 121 |
| YP5 | 28 | 28 | 33 | 20 | 115 | 124 |

|  | XP1 | XP2 | XP3 | XP4 | XP5 | XP6 |
|---|---|---|---|---|---|---|
| YP1 | 0 | 1 | 1 | 0 | 0 | 0 |
| YP2 | 0 | 1 | 1 | 1 | 0 | 0 |
| YP3 | 0 | 0 | 0 | 0 | 0 | 0 |
| YP4 | 0 | 0 | 0 | 0 | 2 | 2 |
| YP5 | 0 | 0 | 0 | 0 | 2 | 2 |

~312

DISPLAY DEVICE

The present application claims priority over Japanese Application JP 2008-300678 filed on Nov. 26, 2008, the contents of which are hereby incorporated into this application by reference.

BACKGROUND OF THE INVENTION (1) Field of the Invention

The present invention relates to an input apparatus for inputting coordinates to the screen and a display device having the same, and in particular, to a display device having an input apparatus of a capacitance coupling type, which is preferable for high precision in detecting coordinates.

(2) Related Art Statement

Display devices having an input apparatus (hereinafter referred to as touch sensor or touch panel) with a function of inputting through a screen where information is inputted through a touch operation on the display screen using a finger or the like of the user (contact or pressing operation, hereinafter simply referred to as touching) are used in mobile electronics, such as PDA's and portable terminals, various types of home electronics, and installed customer guiding terminals, such as automatic teller machines. As for these input apparatuses by means of touching, a resistance film system for detecting a change in the resistance value of the touched portion, a capacitance coupling system for detecting a change in the capacitance, and an optical sensor system for detecting a change in the amount of light of the portion that is blocked through touching are known.

The capacitance coupling system has the following advantages in comparison with the resistance film system and the optical sensor system. The capacitance coupling system is advantageous in that the display quality is not lowered due to transmittance, which is as high as approximately 90%, in comparison with the transmittance of the resistance film system and the optical sensor system, which are approximately 80%, for example. In addition, the capacitance coupling system is advantageous in durability because electrodes for detecting a signal do not make physical contact with other electrodes, while there is a risk with the resistance film system in that the resistance films may deteriorate or break because the touched point is detected through the physical contact of a resistance film.

An example of a touch panel of a capacitance coupling type is disclosed in the following Patent Document 1. In this disclosed system, electrodes for detecting a signal in the longitudinal direction (X electrodes) and electrodes for detecting a signal in the lateral direction (Y electrodes) are arranged in a two-dimensional matrix so that the capacitance of each electrode is detected in an input processing portion. In the case where a conductor, such as a finger, makes contact with the surface of the touch panel, the capacitance of the touched electrodes increases so that this is detected in the input processing portion, and the input coordinates are calculated on the basis of the signals resulting from the change in the capacitance detected by the electrodes. Here, the detection in the capacitance is not affected very much even when the resistance value, which is the physical property of the electrodes for detecting a signal, changes due to the deterioration of the electrodes, and therefore, the precision with the detection at the point of input on the touch panel is slightly affected. As a result, high precision with the detection at the point of input can be achieved.

Here, the Japanese Unexamined Patent Publication 2003-511799 can be cited as a prior art document that relates to the present invention.

SUMMARY OF THE INVENTION

On the touch panel of a capacitance coupling type, however, a change in the capacitance of each electrode for detecting a signal is detected so that input coordinates are detected as in the above described Patent Document 1, and therefore, the input means must be made of a conductive substance. That is to say, in the case where a stylus made of a resin having no conductivity, which can be used in the resistance film system and the like, is made to make contact with the touch panel of the capacitance coupling system, such a problem arises that there is almost no change in the capacitance of the electrodes and the input coordinates cannot be detected.

It is also difficult to detect the two points at which styluses made of a resin are made to make contact on the touch panel of the capacitance coupling system at the same time because two X coordinates and two Y coordinates are detected, providing four possible coordinates as candidates of the contact points when the touch panel is used in such a manner.

Furthermore, in the case where the input means has a small contact surface, there is a problem in finding a method for detecting a signal with high precision without increasing the number of electrodes.

The present invention is provided in order to solve the above described problems with the prior art, and an object of the present invention is to provide a technology which allows a display device having a touch panel of a capacitance coupling type to respond to a non-conductive input means when touched and detect a touched point with high precision when the touched area is small and the number of electrodes is small.

The above described and other objects and novel features of the present invention will be clarified from the description of the present specification and the accompanying drawings.

A representative invention from among the inventions disclosed in the present application is briefly described as follows.

In order to solve the above described problems, the present invention provides a capacitance touch panel having a number of X electrodes, a number of Y electrodes, and a number of Z electrodes. In this capacitance touch panel, the above described X electrodes and the above described Y electrodes cross via a first insulating layer in between and are respectively formed so that pad portions and fine wire portions are alternately aligned in the direction in which the electrodes extend, and the pad portions of the above described X electrodes and the pad portions of the above described Y electrodes are arranged so as not to overlap as viewed in a plane.

In addition, the above described Z electrodes are formed with a second insulating layer in between so that each Z electrode overlaps both an adjacent X electrode and Y electrode as viewed in a plane, and the above described Z electrodes are characterized by electrically floating from each other. At this time, the above described second insulating layer is formed of a material of which the thickness changes when pressure is applied through touching, for example, an elastic insulating material, so that it is possible to change the capacitance between X electrodes and Z electrodes as well as between Y electrodes and Z electrodes even with a non-conductive input means, and thus, it becomes possible to detect touch in a capacitance coupling system.

In addition, the pad portion of a first X electrode extends to the vicinity of the fine wire portion of a second X electrode which is adjacent to the first X electrode and had such a form that the area is minimum in the vicinity of the fine wire portion of the above described second X electrode and the area is maximum in the vicinity of the fine wire portion of the first X electrode as viewed in a plane, and thus, the form of the pad portions of the X electrodes is characterized in that the area is smaller towards the vicinity of the fine wire portion of the second X electrode from the vicinity of the fine wire portion of the first X electrode. As a result, it is possible to calculate the touched point in the coordinates from the ratio of the component of the detected capacitance of a second X electrode even in the case where the space between first X electrodes is great in comparison with the area through which the input means makes contact by means of the touching operation, and thus, it becomes possible to detect a touched point with high precision using a small number of electrodes.

In addition, the above described number of Z electrodes are formed so that each Z electrode overlaps both an adjacent X electrode and Y electrode, and therefore, a change in the capacitance of an adjacent Y electrode can be detected through the Z electrode, even in the case where there is contact with the surface through touching on an X electrode, and conversely, a change in the capacitance of an adjacent X electrode can be detected through the Z electrode, even in the case where there is contact with the surface through touching on a Y electrode, and thus, input coordinates can be detected on the entire surface of the touch panel. At the same time, it becomes possible to reduce the number of Y electrodes.

In addition, a signal is sequentially applied to one set of X electrodes or Y electrodes while a change in the signal is detected by the other set of electrodes so that the electrode to which the signal is applied is identified in advance, and thus, precision in detection in the case where two points are contacted at the same time on the touch panel of a capacitance coupling type can be increased.

According to the present invention, the form and arrangement of the electrodes on the touch panel are adjusted so that it becomes possible to increase the level of precision in detecting contacted points using a smaller number of electrodes in comparison with the prior art.

BRIEF DESCRIPTION OF THE DRAWINGS

FIGS. 4A and 4B are diagrams showing the state where detected values are stored when the capacitance is detected in the display device according to an embodiment of the present invention;

DETAILED DESCRIPTION OF THE INVENTION

In the following, the embodiments of the present invention are described in detail in reference to the drawings.

Here, the same symbols are attached to components having the same functions in all the drawings showing the embodiments, and the descriptions thereof are not repeated.

Figure 1:
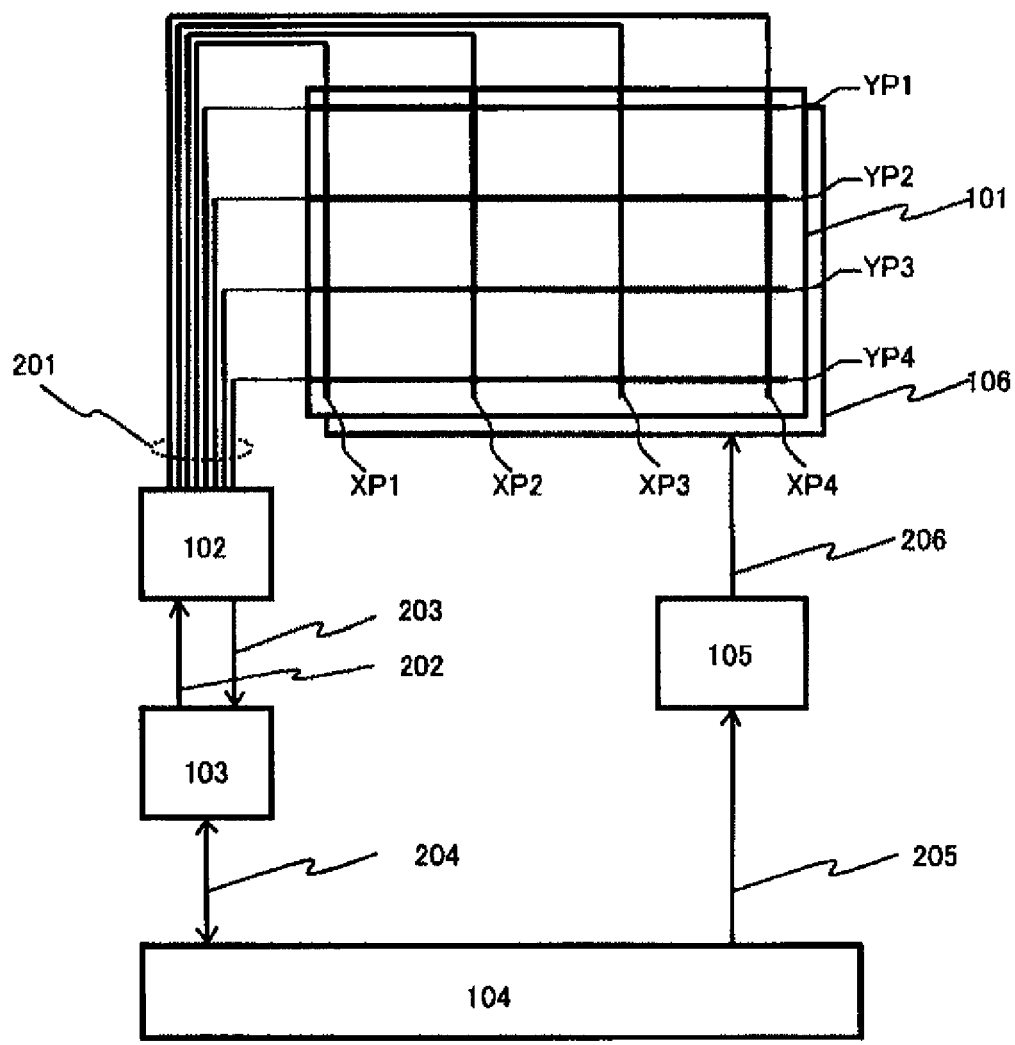
FIG. 1 is a schematic diagram showing the configuration of a display device having the touch panel of a capacitance coupling type according to an embodiment of the present invention.

FIG. 1 shows the configurations of an input apparatus (hereinafter referred to as touch panel) and a display device having the same. In FIG. 1, 101 is the touch panel according to an embodiment of the present invention.

The touch panel 101 has X electrodes XP and Y electrodes YP for detecting a capacitance. Though four X electrodes (XP1 to XP4) and four Y electrodes (YP1 to YP4) are illustrated in the figure, the numbers of electrodes are not limited to this.

The touch panel 101 is provided on the front surface of a display device 106. Accordingly, it is necessary for the light of the displayed image to transmit through the touch panel in order for the user to see the image displayed on the display device, and therefore, it is desirable for the touch panel to have a high level of light transmittance.

The X electrodes and the Y electrodes of the touch panel 101 are connected to a capacitance detecting portion 102 through wires 201 for detecting a signal. The capacitance detecting portion 102 is controlled by a detection control signal 202 outputted from a control operation portion 103 so as to detect the capacitance of each electrode (X electrode, Y electrode) included in the touch panel and output a capacitance detection signal 203, which changes depending on the capacitance value of each electrode, to the control operation portion 103.

The control operation portion 103 calculates the signal components of each electrode from the capacitance detection signal 203 for the electrode, and at the same time, finds input coordinates from the signal components for the electrode through operation. The control operation portion 103 transfers the input coordinates to a system 104 using an I/F signal 204. When input coordinates are transferred from the touch panel 101 through a touching operation, the system 104 generates a display image in accordance with the touching operation and transfers it to a display control circuit 105 as a display control signal 205. The display control circuit 105 generates a display signal 206 in accordance with a display image transferred by the display control signal 205 so that an image is displayed on the display device.

Figure 2A:
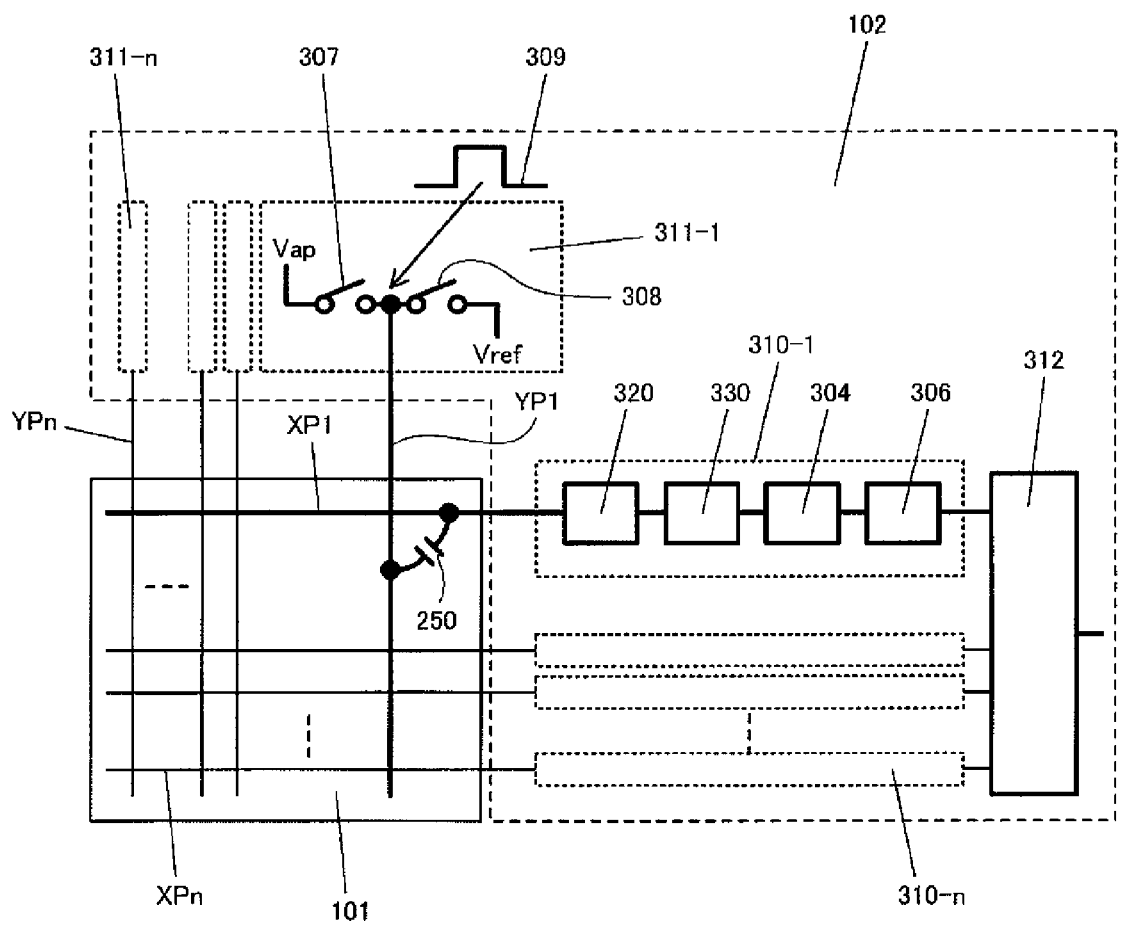
FIGS. 2A and 2B are block diagrams showing the configuration of the circuit for the capacitance detecting portion in the display device according to an embodiment of the present invention.
Figure 2B:
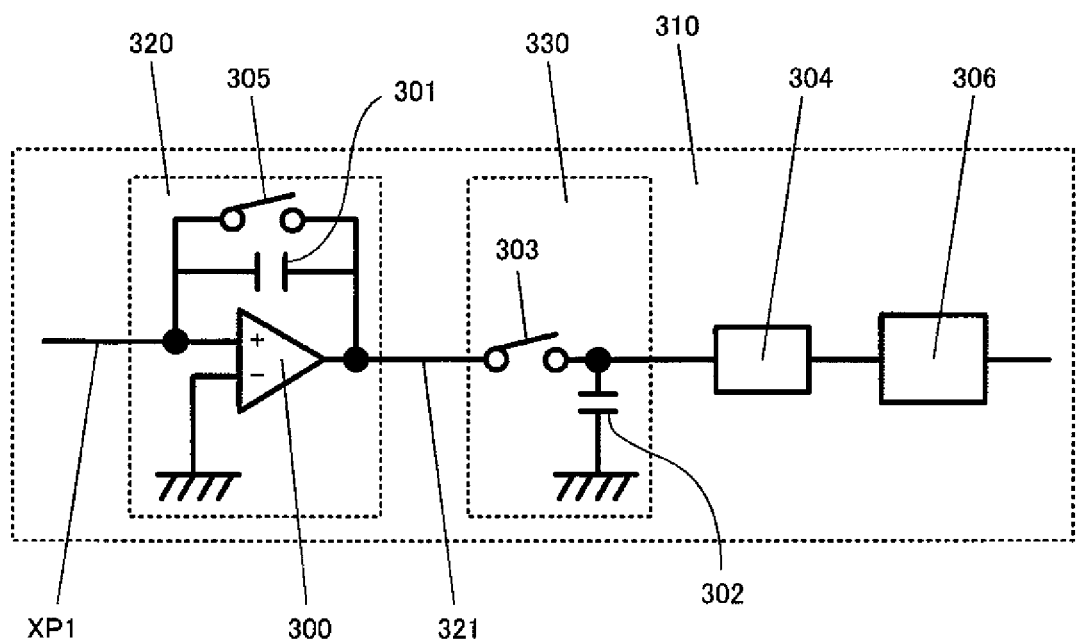

FIG. 2A is a schematic block diagram showing the configuration of the circuit of the capacitance detecting portion 102, and FIG. 2B schematically shows the configuration of a signal reading portion 310. The capacitance detecting portion 102 is formed of a signal input portion 311 for inputting a signal to a Y electrode, a signal reading portion 310 for reading a signal from an X electrode, and a memory portion 312.

Here, though FIG. 2A shows the circuit configuration only for a pair of X electrode XP1 and Y electrode YP1, signal reading portions 310-$n$ and signal input portions 311-$n$ having the same configurations are respectively connected to the X electrodes and the Y electrodes formed on the touch panel 101.

The signal input portion 311 switches the reference potentials Vap and Vref using switches 307 and 308 and applies a voltage in a wave form 309 to the Y electrodes.

The signal reading portion 310 is formed of an integrating circuit 320 made up of an operation amplifier 300, an integrating capacitor 301, and a reset switch 305; a sample hold circuit 330 made up of a sample switch 303 and a hold capacitor 302; a voltage buffer 304; and an analog-to-digital converter 306.

In the following, the operation of the capacitance detecting portion 102 is briefly described. Here, in the initial state of the capacitance detecting portion 102, the integrating capacitor 301 is not charged.

First, the switch 307 is turned on in the initial state and the signal input portion 311 applies a voltage to the Y electrode YP1. As a result, the coupling capacitor 250 between the X electrode and the Y electrode is charged until the voltage applied to the Y electrode YP1 reaches the voltage Vap. At this time, the potential of the X electrode XP1 is always fixed to the ground potential as a result of the negative feedback by the operation amplifier 300. Accordingly, a charge current flows through the integrating capacitor 301 to the output terminal 321 of the operation amplifier 300.

When the voltage of the output terminal 321 of the integrating circuit 320 in this operation is Vo, the capacitance of the coupling capacitor 250 is Cdv and the capacitance of the integrating capacitor 301 is Cr, Vo can be represented by the formula Vo=−Vap(Cdv/Cr), which depends on the size of the Cdv of the coupling capacitor 250 between the X electrode and the Y electrode.

After the output potential Vo of the integrating circuit 320 is determined through the above described operation, the output potential Vo is held by means of the sample hold circuit 330. In the sample hold circuit 330, first, the sample switch 303 is turned on and then turned off after a predetermined period of time has elapsed, and thus, the output potential Vo is held in the hold capacitor 302. The potential Vo held in the hold capacitor 302 is inputted into the analog-to-digital converter 306 through the voltage buffer 304 so as to be converted to digital data.

Here, though the voltage held by the sample hold circuit 330 is inputted into the analog-to-digital converter 306 by means of the voltage buffer 304 in the configuration, the voltage buffer 304 may have a structure with voltage amplification.

In addition, the signal reading portions respectively connected to the X electrodes other than the above described X electrodes XP1 operate in the same manner as the signal reading portion 310 connected to the X electrode XP1 so that the potential outputted from the integrating circuit due to an input signal from the Y electrode YP1 is read out simultaneously as that of the X electrode XP1.

The output of the signal reading portion 310 connected to each X electrode is inputted into the memory portion 312 so that the output data thereof is held in the memory portion 312. The memory portion 312 sends and receives hold data to and from the operation control portion 103 shown in FIG. 1.

A signal 309 is sequentially applied to the Y electrodes YP, and a voltage is sequentially applied to the Y electrodes YP so that the capacitance is detected. In addition, the signal reading portion 310 is controlled so that the reset switch 305 is once turned on prior to the detection of the capacitance, and after that, turned off, and thus, the integrating capacitor 301 in each integrating circuit is reset.

Hereinafter, the same operation is repeated. Here, the timing according to which a signal 309 is applied to any Y electrode YP is set so that a pulse signal is applied to a certain Y electrode YP for a certain period of time, and thus, the counting by the reference clock or the like makes it possible to determine from which Y electrode YP the output signal is outputted to the X electrode XP.

Figure 3:
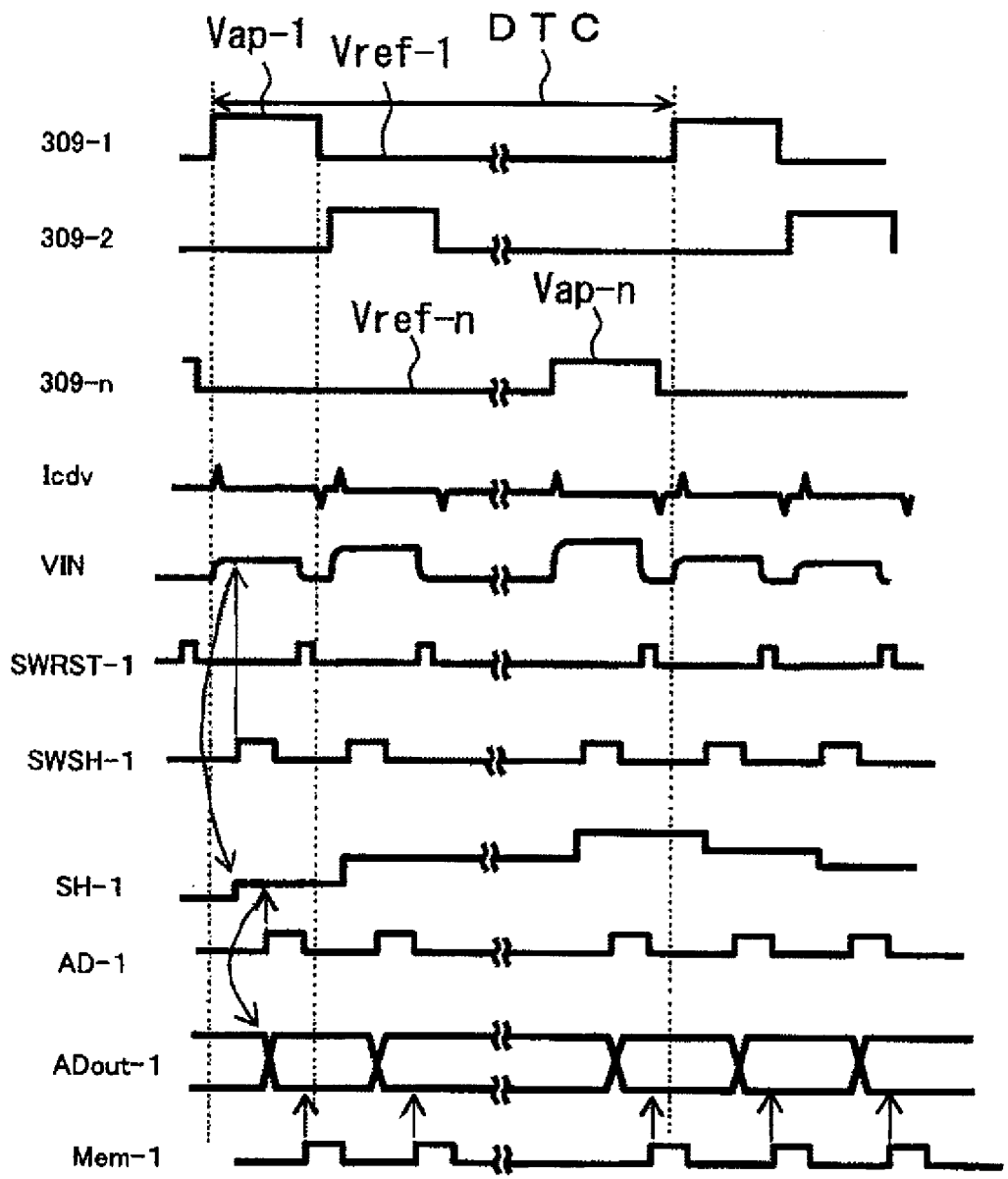
FIG. 3 is a timing chart illustrating the operation of the capacitance detecting portion in the display device according to an embodiment of the present invention.

FIG. 3 is a timing chart showing the operation of the capacitance detecting portion 102 shown in FIGS. 2A and 2B. Signals 309-1 to 309-$n$ have operational signal waveforms in the signal input portions 311-1 to 311-$n$, and signal input portions 311-1 to 311-$n$ sequentially output a signal 309 to the Y electrodes YP1 to YPn during the detection period DTC. Hereinafter, the signal 309 is referred to as pulse signal.

The waveform Icdv is a current waveform that flows through the coupling capacitor 250 (Cdv) between the X and Y electrodes shown in FIGS. 2A and 2B. When the signal input portion 311 inputs a signal so that the potential of the Y electrode YP increases, a current flows transitionally. In addition, when the potential of the Y electrode YP decreases, a current flows transitionally.

The waveform VIN corresponds to the waveform outputted from the integrating circuit 320 shown in FIGS. 2A and 2B, that is to say, the voltage Vo of the output terminal 321 of the above described integrating circuit 320 that corresponds to the respective pulse signals 309. In addition, the waveform SWRST-1 is the waveform of the control signal from the reset switch 305 shown in FIGS. 2A and 2B.

When the reset switch control signal SWRST-1 rises, the integrating circuit 320 is reset, the waveform VIN decreases, and the signal reading portion 310 becomes of an initial state. After that, a pulse signal 309 is inputted from the signal input portion 311 so that the waveform VIN outputted from the integrating circuit 320 again rises. Hereinafter, this operation is repeated.

Here, in the present embodiment, the amplitude of the waveform VIN changes, and this indicates that the size of the detected capacitance changes every time the Y electrode to which a signal is inputted changes. That is to say, this indicates that the signal VIN that reflects this change in the capacitance locally changes so as to indicate the contact point when an object to be detected makes contact with the touch panel 101.

The waveform SWSH-1 is a signal for controlling the sampling switch 303 in the sample hold circuit 330 shown in FIGS. 2A and 2B. In addition, the waveform SH-1 shows the signal outputted from the sample hold circuit 330. During the time span when the signal SWSH-1 rises, the sampling switch 303 is in an on state and the potential inputted to the sample hold circuit 330, that is to say, the potential outputted from the integrating circuit 320 (waveform VIN), is applied to the hold capacitor 302. When the signal SWSH-1 decreases, the sampling switch 303 becomes of an off state and the voltage applied to the hold capacitor 302 is held. As shown in the waveform SH-1, the output of the sample hold circuit 330 is updated for every sampling operation.

The waveform AD-1 is a signal for controlling the analog-to-digital converter 306 shown in FIGS. 2A and 2B, and the waveform ADout-1 is a signal outputted from the analog-to-digital converter 306. Whenever the waveform SH-1 outputted from the sample hold circuit is updated, a signal AD-1 is issued with a predetermined time difference being provided. When a signal AD-1 is outputted, the analog-to-digital converter 306 outputs the input voltage as digital data ADout-1 having a predetermined resolution.

The waveform Mem-1 is a write-in control signal for the memory portion 312 shown in FIGS. 2A and 2B. Whenever the signal ADout-1 is updated, a signal Mem-1 is issued with a predetermined time difference being provided. When a signal Mem-1 is issued, digital data ADout-1 is written in the memory portion 312.

Though a change in the signal waveform accompanying the operation of the capacitance detecting portion 102 is described focusing on the signal reading portion 310 shown in FIGS. 2A and 2B, the signal reading portions (310-$n$) connected to other X electrodes also have the same operations and changes in the waveform.

FIG. 4A shows the detected values stored in the memory portion 312 shown in FIGS. 2A and 2B in such a manner that the detected values are distinguished from each other due to the timing according to which they are taken in and made to correspond to the coordinates determined by the X and Y electrodes. Here, the squares show the locations where the electrodes aligned along the lateral axis and the longitudinal axis cross. In addition, the numerical values within these squares reflect the capacitance values at the respective intersections gained during the detection process. The greater the numerical values are, the greater the capacitance values are, and it is determined from the size of the numerical values or threshold values whether or not an object to be detected makes contact on the touch panel 101.

FIG. 4B shows the results of determination in the state shown in FIG. 4A using a threshold value where it is concretely determined that there is contact in the case where the numerical value exceeds 100. The same numbers are attached to the groups having the same results through a grouping process. After this process, the distribution of the signal intensity is analyzed for each group and converted to coordinates of contact of an object to be detected on the touch panel 101.

Here, though a generally known labeling process is used for the grouping process, the invention is not limited to this. In addition, it is clear from the above described capacitance detecting process that the means for calculating the coordinates of the contacts of an object to be detected on the touch panel 101 from the data gained as in FIG. 4A is not limited to the method described here.

Figure 5A:
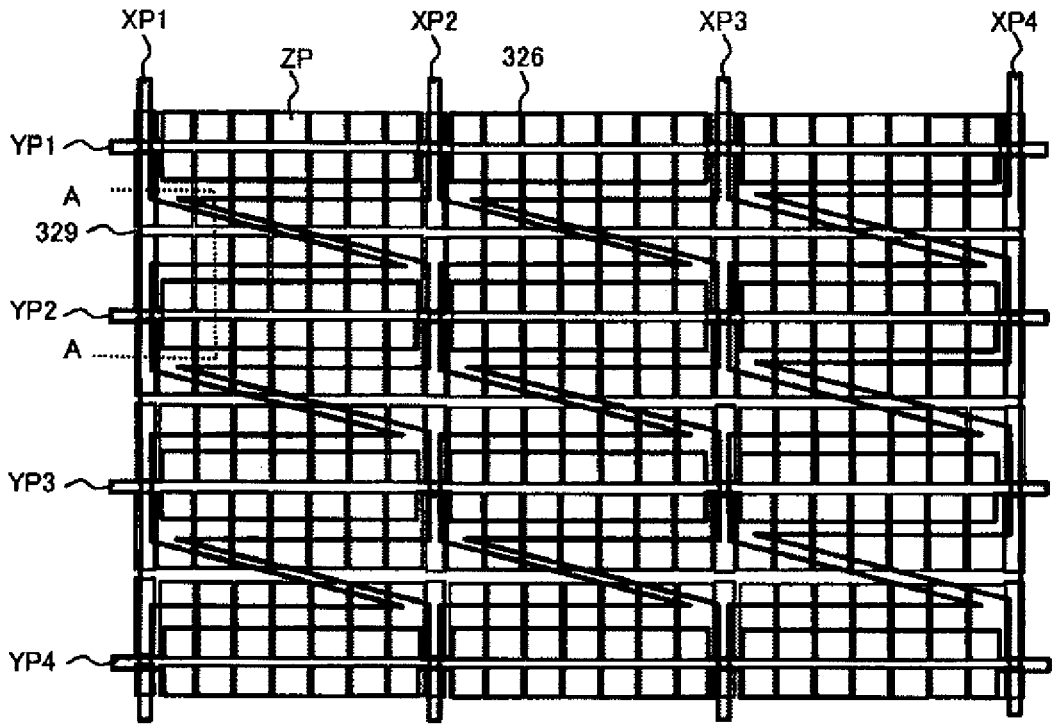
FIGS. 5A and 5B are schematic plan diagrams showing the form of the electrodes on the touch panel of a capacitance coupling type according to an embodiment of the present invention.
Figure 5B:
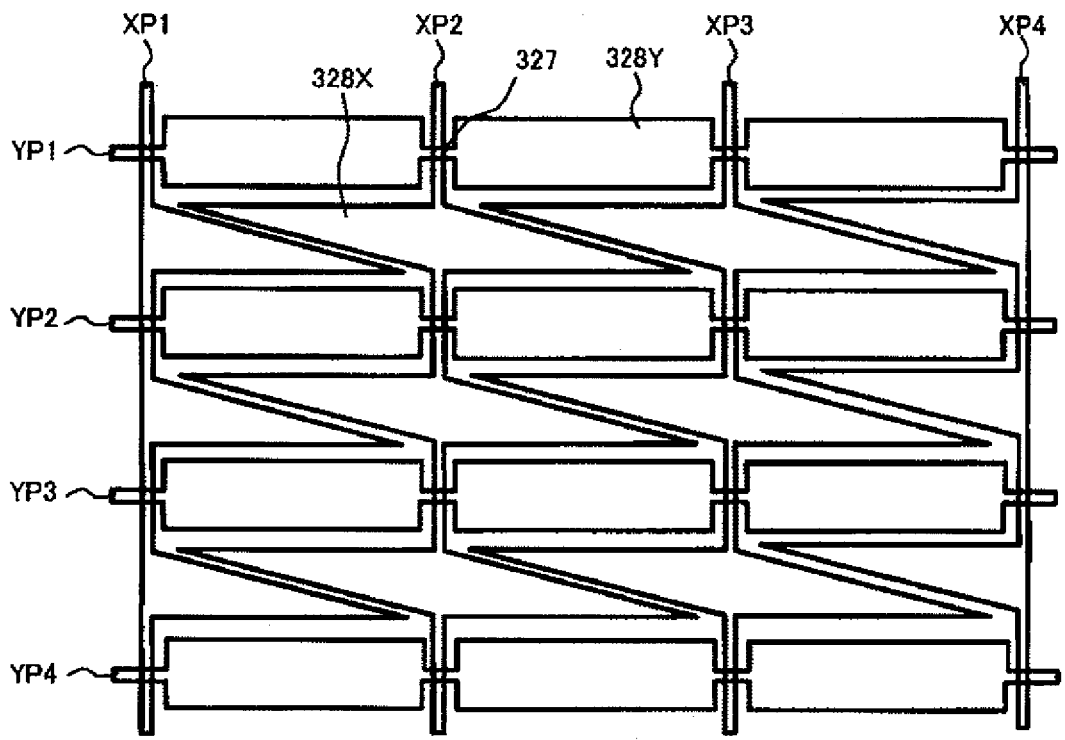
Figure 6:
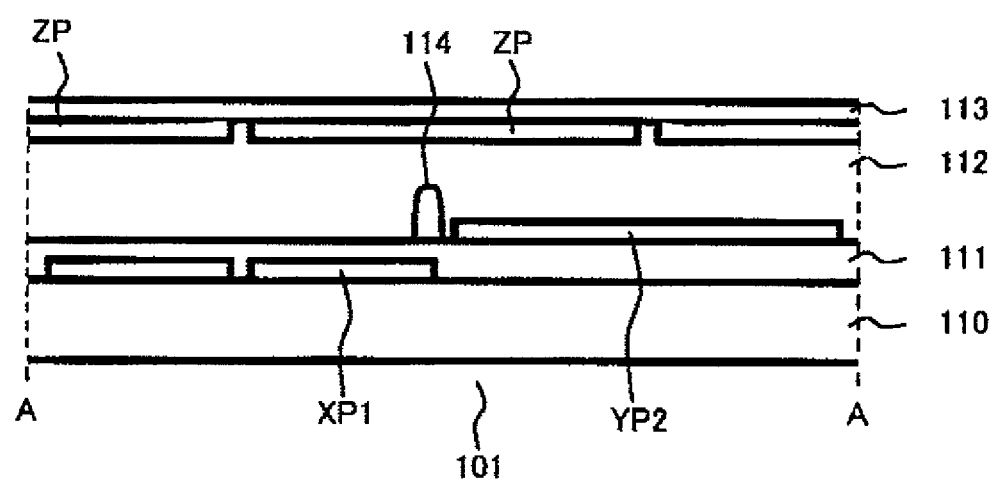
FIG. 6 is a cross sectional diagram showing the main portion of the electrode structure of the touch panel of a capacitance coupling type according to an embodiment of the present invention.

Next the electrodes for detecting the capacitance provided on the touch panel 101 according to the embodiment of the present invention are described in reference to FIGS. 5A to 6.

FIG. 5A is a diagram showing electrode patterns of X electrodes XP and Y electrodes YP for detecting the capacitance on the touch panel 101 as well as Z electrodes ZP positioned on top of the X electrodes XP and the Y electrodes YP. The X electrodes XP are connected to a capacitance detecting portion 102 through wires 201 for detecting a signal, for example. Meanwhile, a pulse signal 309 having a preset voltage is applied to the Y electrodes YP according to preset timing during a certain period of time. The Z electrodes ZP have no electrical connections, and thus, are of a floating state.

FIG. 5B is a diagram showing just the electrode patterns of the X electrodes XP and the Y electrodes YP. The Y electrodes YP extend in the lateral direction of the touch panel 101, and a number of Y electrodes YP are aligned in the longitudinal direction. The Y electrodes YP and the X electrodes XP are narrow at the intersections of the Y electrodes YP and the X electrodes XP in order to reduce the capacitance between the electrodes that cross. These portions are referred to as fine wire portions 327. Accordingly, the Y electrodes YP are in such a form that fine wire portions 327 and the remaining electrode portions (hereinafter referred to as pad portions 328) are alternately aligned in the direction in which the Y electrode YP extends.

The X electrodes XP are located between adjacent Y electrodes YP. The X electrodes XP extend in the longitudinal direction of the touch panel 101 and a number of X electrodes XP are aligned in the lateral direction. In the same manner as the Y electrodes YP, the X electrodes XP have such a form that fine wire portions 327 and pad portions 328X are alternately aligned in the direction in which the X electrode XP extends.

As shown in FIG. 5B, the pad portions 328X of the X electrodes XP are in a diamond shape. In order to describe the form of the pad portions 328X of the X electrodes XP, the position of the wire for connecting an X electrode XP to a wire for detecting a signal (or the fine wire portion 327 of an X electrode XP) is assumed to be at the center of the X electrode XP in the lateral direction. The pad portions 328X of the X electrodes XP have such a form that the area becomes smaller towards the center of an adjacent X electrode XP and the area becomes greater towards the center of the X electrode XP.

As for the area of the X electrodes XP between two adjacent X electrodes XP, for example between the X electrodes XP1 and XP2, the area (width) of the pad portion 328X of the X electrode XP1 is maximum and the area (width) of the pad portion 328X of the X electrode XP2 is minimum in the vicinity of the center of the X electrode XP1. Meanwhile, the area (width) of the pad portion 328X of the X electrode XP1 is minimum and the area (width) of the pad portion 328X of the X electrode XP2 is maximum in the vicinity of the center of the X electrode XP2. Here, the pad portions 328X between two adjacent X electrodes XP are characterized by having such a form that the ends are tapered toward the adjacent X electrodes XP.

Though the ends of the X electrodes XP are tapered toward the left and right in FIG. 5B, the form of the X electrodes XP is not limited to this. For example, the left end of the pad portions 328X of the X electrodes XP may be tapered toward the left and the right end may have a recess facing the right; the right end of the X electrodes XP may be tapered towards the right, and the left end may have a recess facing the left; or the left and right ends of the X electrodes XP may be tapered towards the left and right, and the left and right ends of the adjacent X electrodes XP may have recesses facing the left and right.

Next, the form of the Z electrodes ZP is described. In FIG. 5A, a number of Z electrodes ZP are separated from each other by a number of slits 329 which are parallel to the direction in which the Y electrodes YP extend and a number of slits 326 which are parallel to the direction in which the X electrodes XP extend.

In FIG. 5A, the slits 329 which are parallel to the direction in which the Y electrodes YP extend are located in the middle of the X electrodes XP and in the middle of the Y electrodes YP. It is desirable for each X electrode XP to have a slit 329 located in the vicinity of the center in the longitudinal direction. In addition, it is desirable for each Y electrode YP to have a slit 329 located in the vicinity of the center in the longitudinal direction. Alternatively, the slits 329 may be located only in the middle of the X electrodes XP or only in the middle of the Y electrodes YP.

Meanwhile, a number of slits 326, which are parallel to the X electrodes XP, are located in each sector between adjacent X electrodes XP. In this case, though the intervals between the slits 326 which are parallel to the direction in which the X electrodes XP extend can be set to any value, it is desirable for the intervals to be close to the minimum size of the area on which the assumed input means makes contact.

FIG. 6 is a schematic cross sectional diagram along line A-A in FIG. 5A. Here, the cross sectional diagram of FIG. 6 only shows layers which are necessary in order to describe the operation of the touch panel.

The electrodes of the touch panel 101 are formed on top of a transparent substrate 110. In the following, layers are described in a successive order starting from the layer closest to the transparent substrate 110. First, X electrodes XP are formed in the location closest to the transparent substrate 110, and then, an insulating film 111 for insulating the X electrodes from Y electrodes are formed. After that, Y electrodes YP are formed. Here, the positions of X electrodes XP and Y electrodes YP may be interchanged. After the Y electrodes YP, an insulating layer 112 for detecting pressure is provided and followed by Z electrodes ZP and a protective layer 113.

The insulating layer 112 for detecting pressure may be a transparent insulating material of which the film thickness changes when pressed through a touching operation. The insulating layer 112 for detecting pressure may be formed of an elastic insulating material, for example. The insulating layer 112 for detecting pressure is preferably a gas, such as air, of which the volume changes depending on the pressure. In this case, spacers 114 may be provided between the Z electrodes ZP and the X electrodes XP as well as between the Z electrodes ZP and the Y electrodes YP in order to maintain the interlayer distance constant when there is no contact present.

Next, changes in the capacitance at the time of a touching operation on the touch panel 101 are described in reference to FIGS. 7A to 8B.

Figure 7A:
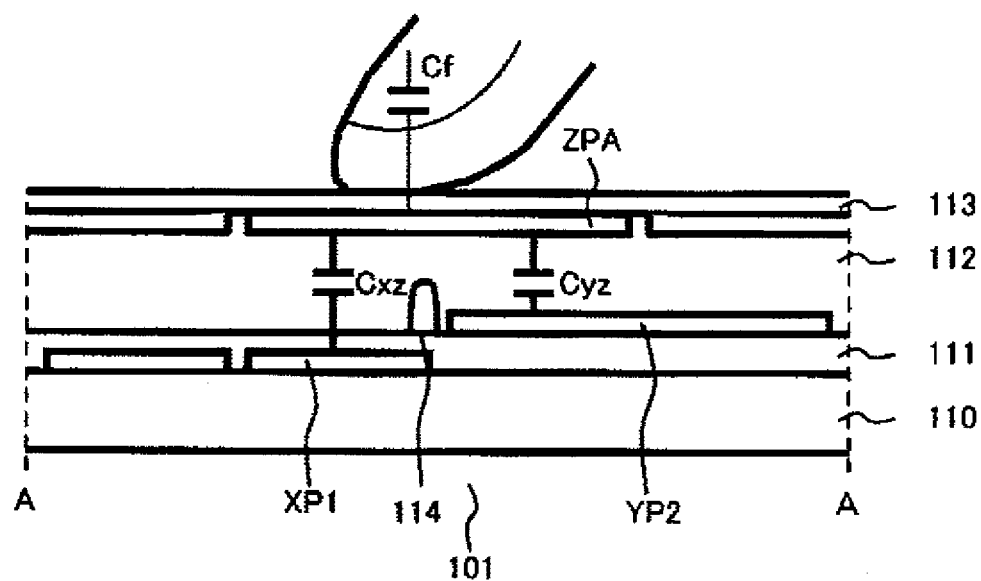
FIGS. 7A and 7B are schematic diagrams illustrating a change in the capacitance through a touching operation using a finger or the like on the touch panel of a capacitance coupling type according to an embodiment of the present invention.
Figure 7B:
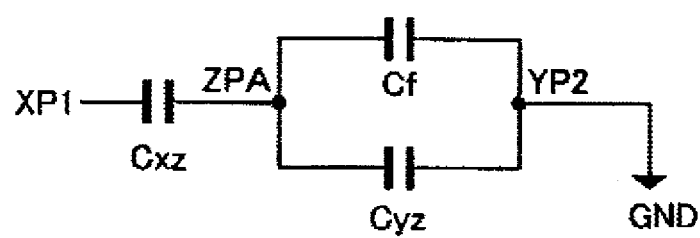

FIGS. 7A and 7B are schematic diagrams illustrating a change in the capacitance in the case where the input means for the touching operation is a conductor such as a finger. Here it is assumed that the pressure for touching is too small to change the thickness of the insulating layer 112 for detecting pressure.

In addition, each electrode has a capacitance gained by combining fringe capacitance with adjacent electrodes, capacitances at intersections and other parasitic capacitances. Here, it is assumed that there is a change only in the capacitance of a parallel plate conductor between the Z electrode ZP and the X and Y electrodes and the other capacitors do not have a change in the capacitance whether or not a touching operation is carried out. Here the capacitance between the Z electrode ZPA and the X electrode XP1 is Cxz and the capacitance between the Z electrode ZPA and the Y electrode YP2 is Cyz.

When the capacitance detecting portion 102 detects the capacitance of the X electrode XP1, the Y electrode YP2 is at a certain reference potential in a reset state. The Z electrode ZPA is in a floating state, and therefore, the composite capacitance of the X electrode XP1 is the capacitance of Cxz and Cyz connected in series. At this time, the composite capacitance Cxp of the X electrode can be represented by $Cxp=Cxz \cdot Cyz/(Cxz+Cyz)$.

Meanwhile, in the case where a finger is contacted through a touching operation, the capacitance component Cf of the finger can be regarded as being electrically connected to the Z electrode ZPA. FIG. 7B shows an equivalent circuit of the composite capacitance in this case, and the composite capacitance Cxpf of the X electrode at the time of the touching operation can be represented by $Cxpf=Cxz \cdot (Cyz+Cf)/(Cxz+Cyz+Cf)$.

The control operation portion 103 calculates the difference between the capacitance Cxp of the X electrode XP1 when a touching operation is carried out and the capacitance Cxpf of the X electrode XP1 when no touching operation is carried out as a signal component of the X electrode XP1. The difference $\Delta Cxp$ in the electrode capacitance whether or not a touching operation is carried out is $\Delta Cxp = Cxz^2 \cdot Cf / \{(Cxz+Cyz)(Cxz+Cyz+Cf)\}$, and thus, the difference $\Delta Cxp$ of the capacitance of the X electrode depends on the capacitance Cf of the finger. Therefore, a change in the capacitance of the X electrode XP1 can be detected as a change in the signal when the control operation portion 103 applies a pulse signal 309 of a certain voltage to the Y electrode YP2.

Figure 8A:
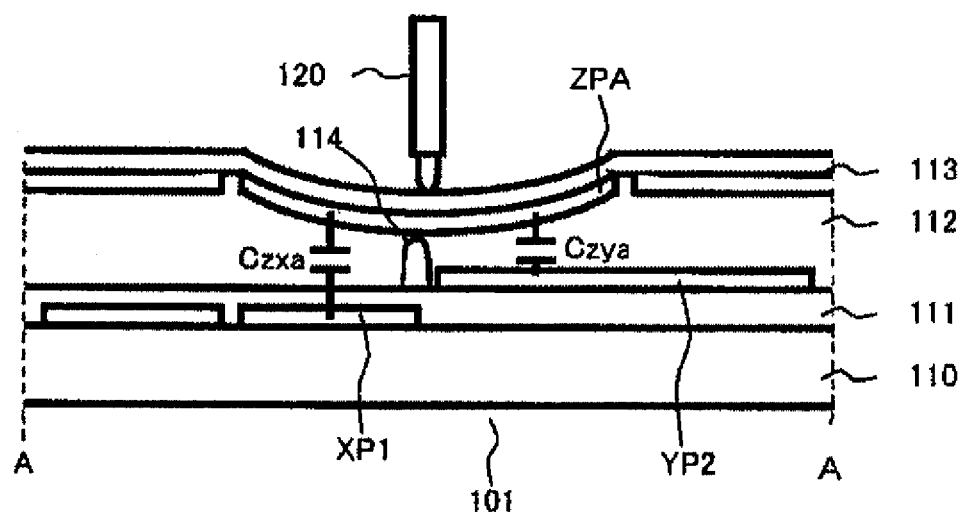
FIGS. 8A and 8B are schematic diagrams illustrating a change in the capacitance through a change in the thickness of the insulating layer for detecting pressure in the touch panel of a capacitance coupling type according to an embodiment of the present invention.
Figure 8B:
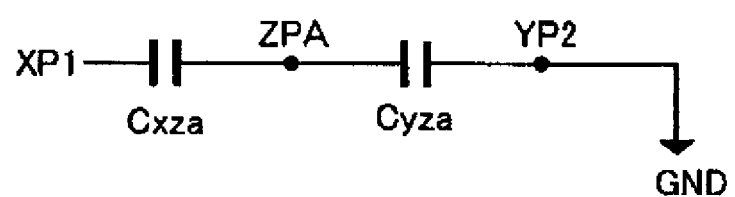

FIGS. 8A and 8B are schematic diagrams illustrating a change in the capacitance in the case where the input means through a touching operation is a stylus 120 made of a non-conductive resin, for example, and the thickness of the insulating layer 112 for detecting pressure changes when pressure is applied as a result of touching.

The capacitance of the X electrode XP1 when a touching operation is not carried out can be represented as illustrated in FIGS. 7A and 7B. FIGS. 8A and 8B are diagrams when the insulating layer 112 for detecting pressure between the Z electrode ZPA and the X electrode XP or the Y electrode YP (hereinafter the two electrodes are referred to as electrodes for detecting capacitance) becomes thinner when pressed as a result of touching.

In this case, the capacitance between parallel plates is inversely proportional to the thickness, and therefore, there are the relationships Cxza>Cxz and Cyza>Cyz when the capacitance between the Z electrode ZPA and the X electrode XP1 is Cxza and the capacitance between the Z electrode ZPA and the Y electrode YP2 is Cyza.

When the capacitance detecting portion 102 detects the capacitance of the X electrode XP1, the Y electrode YP2 has a certain reference potential in a reset state. Therefore, the composite capacitance of the X electrode XP1 is the capacitance of Cxza and Cyza connected in series because the Z electrode ZPA is in a floating state. At this time, the composite capacitance Cxpa of the X electrode can be represented by $Cxpa=Cxza \cdot Cyza/(Cxza+Cyza)$.

The control operation portion 103 calculates the difference between the capacitance Cxp of the X electrode XP1 when a touching operation is carried out and the capacitance Cxpa of the X electrode XP1 when no touching operation is carried out as a signal component of the X electrode XP1. The difference $\Delta Cxpa$ in the electrode capacitance whether or not a touching operation is carried out can be represented by $\Delta Cxpa = \{Cxz \cdot Cxza(Cyza-Cyz) + Cyz \cdot Cyza(Cxza-Cxz)\} / \{(Cxz+Cyz)(Cxza+Cyza)\}$.

When a pulse signal 309 of a certain voltage is applied to the Y electrode YP2, the capacitance detecting portion 102 can detect the difference $\Delta Cxpa$ in the capacitance of the X electrode XP1 as a change in the signal.

As described above, the use of the insulating layer 112 for detecting pressure and the Z electrode ZP makes it possible to detect the input coordinate as a result of a change in the capacitance when the thickness of the insulating layer 112 for detecting pressure is changed when pressed by even a non-conductive input means.

Figure 9:
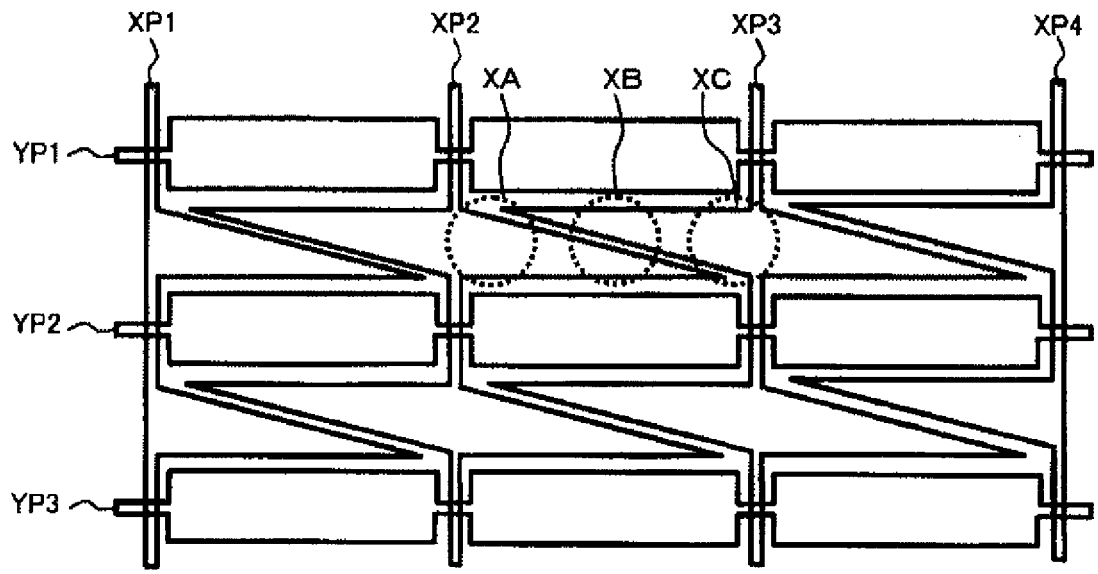
FIG. 9 is a schematic plan diagram showing points of contact when being moved in the X direction on the touch panel of a capacitance coupling type according to an embodiment of the present invention.

Next, signal components of each electrode are described in reference to FIG. 9 in the case where the area of contact through a touching operation is small and the location of the contact surface changes in the lateral direction.

FIG. 9 shows a manner in which the location of the contact surface changes on the X electrode between two adjacent X electrodes XP2 and XP3. XA is in the vicinity of the center of the X electrode XP 2, XB is in the vicinity of the middle between the X electrodes XP2 and XP3, and XC is in the vicinity of the center of the X electrode XP3. FIG. 9 does not show the Z electrode ZP for the sake of simplicity.

The capacitance Cf described in reference to FIGS. 7A and 7B and a change in the capacitance between the Z electrode ZP and the electrode for detecting capacitance described in reference to FIGS. 8A and 8B depend on the area of the contact surface. Therefore, signal components are large when the area through which the electrode for detecting capacitance and the contact surface overlap is great, and conversely, signal components are small when the area through which the electrode for detecting capacitance and the contact surface overlap is small.

In the point XA, the contact surface and the X electrode XP2 mostly overlap while the contact surface barely overlaps with the X electrode XP3, and therefore, the signal component of the X electrode XP2 is large while the signal component of the X electrode XP3 is small. In the point XB, the areas through which the contact surface overlaps with the X electrodes XP2 and XP3 are approximately equal, and therefore, the calculated signal components are approximately equal between the X electrodes XP2 and XP3. Furthermore, in the point XC, the contact surface and the X electrode XP3 mostly overlap while the contact surface barely overlaps with the X electrode XP2, and therefore, the signal component of the X electrode XP3 is large while the signal component of the X electrode XP2 is small. The control operation portion 103 calculates the centroid using the signal components of the electrodes so as to find the input coordinates on which the contact surface makes contact through a touching operation.

In the case where approximately the same level of signal components are gained between the X electrodes XP2 and XP3 as in the point XB, the centroid is located between the X electrodes XP2 and XP3, and therefore, the input coordinates can be calculated. Meanwhile, in the case where the signal component of one X electrode is very large, as in the points XA and XB, the centroid is located in the vicinity of the X electrode from which the larger signal component is detected, and therefore, the input coordinates can be calculated in the same manner.

As described above, the X electrodes have such a form that it becomes narrower towards an adjacent electrode, thus making it possible to calculate the centroid even in the case where the intervals between the X electrodes are wide in comparison with the contact surface, and therefore, it is possible to detect the location with high precision. Thus, it becomes possible to reduce the number of electrodes in comparison with conventional electrode patterns by expanding the intervals between the X electrodes relative to the contact surface. In addition, even when the form of the X electrodes is discrete with Y electrodes in between, it becomes possible to detect the input coordinates in the X direction throughout the entire surface of the touch panel by locating the Z electrode ZP which is electrically floating so that it settles over adjacent X electrode XP and Y electrode YP.

Figure 10:
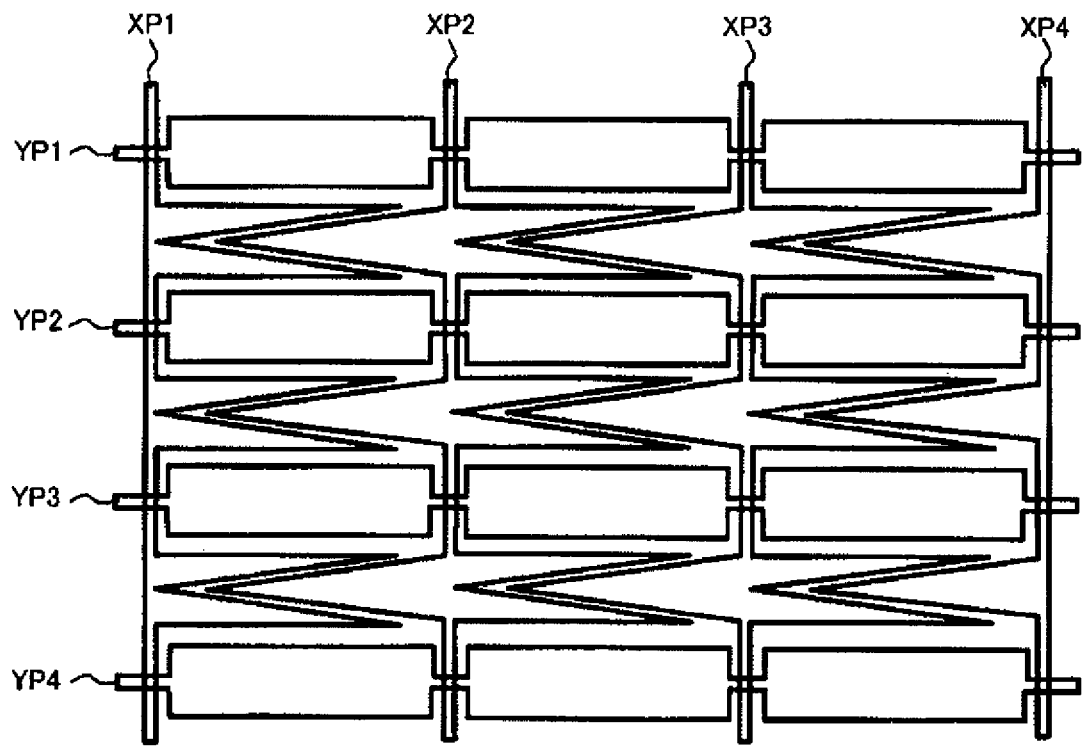
FIG. 10 is a schematic plan diagram showing a modification of the form of the electrodes on the touch panel of a capacitance coupling type according to an embodiment of the present invention.

FIG. 10 shows a case where the form of the X electrodes XP shown in FIG. 5B is modified. In FIGS. 5B and 10, the forms of the Y electrodes YP are the same. In FIG. 5B, the form of the X electrodes XP is tapered towards the two sides, left and right, while in FIG. 10 the X electrodes XP2 are tapered towards one adjacent X electrode XP1 and have a recess facing the other adjacent X electrode XP3.

In both FIGS. 5B and 10, the X electrodes XP have the same feature in that the area is smaller towards the center of adjacent X electrodes XP and the area is greater towards the center of the X electrodes XP. Therefore, the X electrodes XP shown in FIG. 10 can be expected to have the same effects as those in FIG. 5B. Here, the form of the X electrodes is not limited to those shown in FIGS. 5B and 10 as long as the area is smaller towards the center of adjacent X electrodes and the area is greater towards the center of the X electrodes.

Figure 11A:
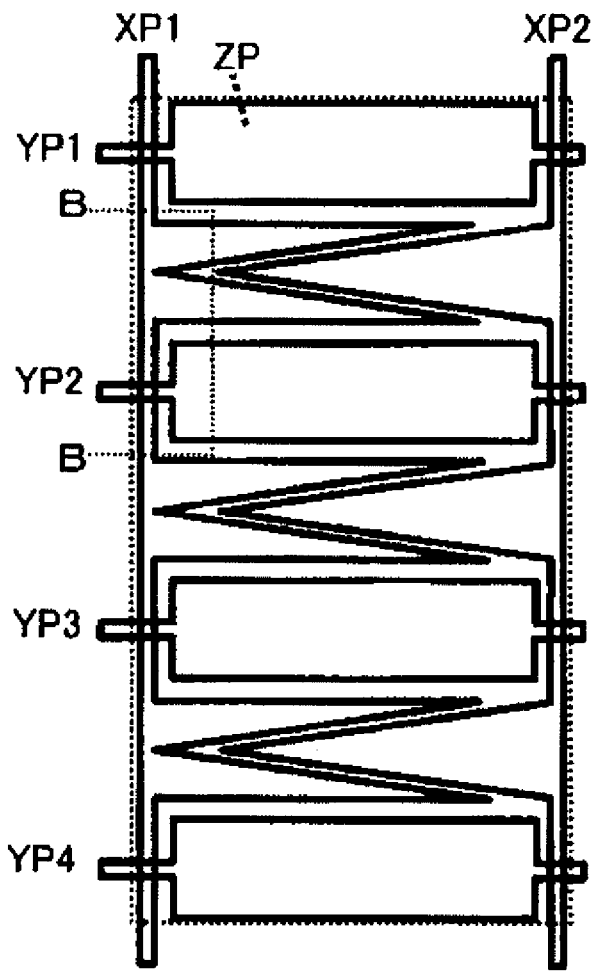
FIGS. 11A and 11B are schematic diagrams showing another modification of the form of the electrodes on the touch panel of a capacitance coupling type according to an embodiment of the present invention.
Figure 11B:
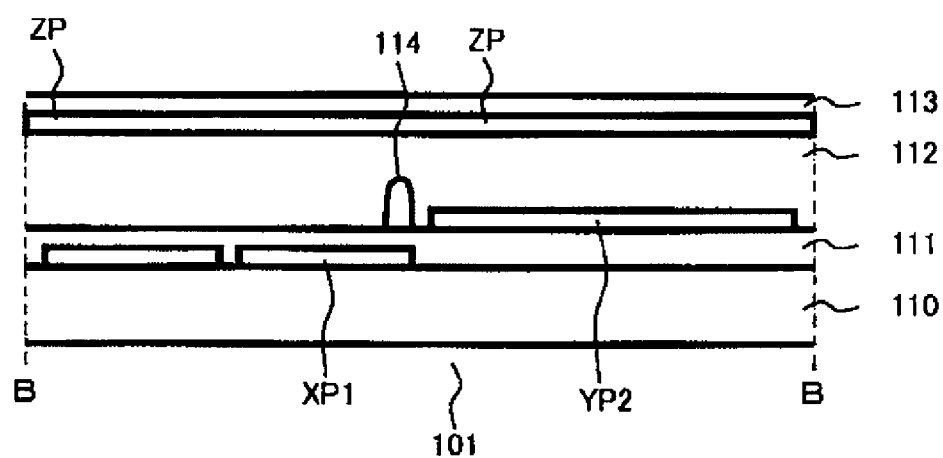

Next, FIGS. 11A and 11B show a touch panel having no slits created in the Z electrode ZP. FIG. 11B is a schematic cross sectional diagram along line B-B in FIG. 11A. The Z electrode ZP shown in FIG. 19 does not have a slit that divides the electrode but has a solid sheet form. This Z electrode ZP in a solid sheet form is also in an electrically floating state. The Z electrode ZP in a solid sheet form is located above the X electrodes XP and the Y electrodes YP with an insulating layer 112 for detecting pressure in between.

Even in the case where a Z electrode ZP in a solid sheet form is used, a change in the capacitance due to a change in the interlayer distance of the insulating layer 112 for detecting pressure can be detected as a signal component in approximately the same manner as when a Z electrode ZP with slits is used. In addition, it was found that though the interlayer distance of the insulating layer 112 for detecting pressure does not change when a finger or the like makes slight contact, a signal component at approximately the same level as in the case where a Z electrode ZP having slits is used can be gained when the sheet resistance of the Z electrode is high. When the sheet resistance of the Z electrode is high, it becomes possible to charge or discharge only the electrode for detecting capacitance that is closer to the conductor that makes contact due to the capacitor formed between the electrode and the conductor that makes contact. In this manner, it becomes possible to detect a signal component by making the resistance of the Z electrode high and allowing a local capacitor to charge or discharge.

Figure 12A:
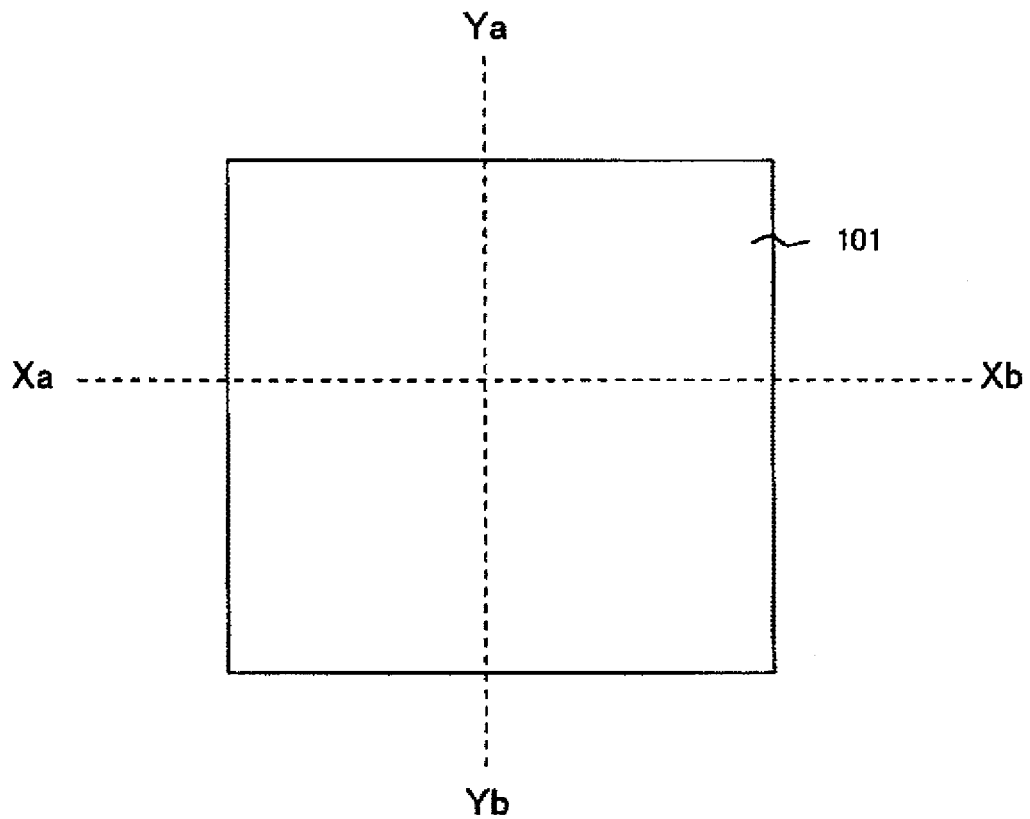
FIGS. 12A to 12C are schematic diagrams showing the structure in a cross section of the touch panel of a capacitance coupling type according to an embodiment of the present invention.
Figure 12B:
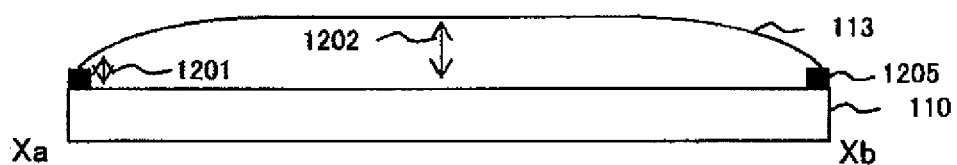
Figure 12C:
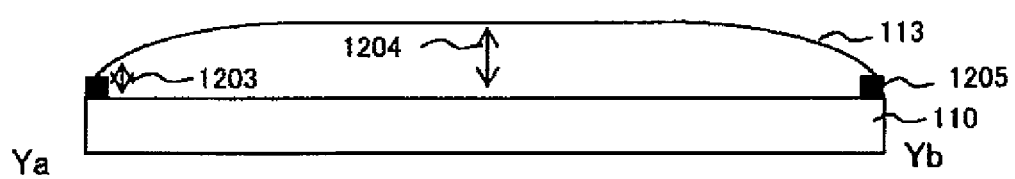

FIGS. 12A to 12C are diagrams showing the structure of a touch panel 101 in a cross section. FIGS. 12B and 12C show the relationships in the distance between the protective layer 113 and the transparent substrate 110 in the structure in cross sections along lines Xa-Xb and Ya-Yb in FIG. 12A. FIG. 12B shows the structure in a cross section along the above described line Xa-Xb. The protective layer 113 is connected to the transparent substrate 110 via a connection portion 1205. Here, the relationship between the distance 1201 between the protective layer 113 and the transparent substrate 110 in the vicinity of the connection portion 1205 and the distance 1202 between the protective layer 113 and the transparent substrate 110 in the vicinity of the center point of the line section Xa-Xb satisfies the formula: distance 1201<distance 1202.

In addition, FIG. 12C shows the structure in a cross section along the above described line Ya-Yb. The protective layer 113 is connected to the transparent substrate 110 via the connection portion 1205 in the same manner as in the above. Here, the relationship between the distance 1203 between the protective layer 113 and the transparent substrate 110 in the vicinity of the connection portion 1205 and the distance 1204 between the protective layer 113 and the transparent substrate 110 in the vicinity of the center point of the line section Ya-Yb satisfies the formula: distance 1203<distance 1204.

In the case where at least one of the above described relationships satisfies the formula, the resilient force of the protective layer 113 in the upwards direction is strong in the structure, and therefore, the return to the original form of the protective layer 113 is accelerated, and thus, the response rate is high after the contact on the touch panel 101 is broken off.

As described above, in the present embodiment the capacitance changes when even a non-conductive input means makes contact on the touch panel and the distance between an X electrode XP or a Y electrode YP for detecting capacitance and the Z electrode ZP on top of the X electrode XP or the Y electrode YP changes, and therefore, the input coordinates can be detected on the touch panel of a capacitance coupling type. As a result, it becomes possible to use a stylus made of a resin having a low conductance.

In addition, the form of the electrodes can be adjusted so that the point of input between adjacent X electrodes can be calculated from the signal ratio in the change of the capacitance gained from the two adjacent X electrodes, and thus, the number of X electrodes can be reduced and the arrangement of the Z electrode can be adjusted so that the number of Y electrodes can be reduced. As a result, the width of the frame required for the wires for connecting the electrodes for detecting a signal to the input processing portion can be made smaller, and thus, the freedom in designing can be increased. In addition, the number of terminals for the input processing portion can be prevented from increasing, and therefore, a capacitance coupling type touch panel which can detect an input point with high precision can be implemented at low cost. In addition, the input coordinates can be detected with high precision with an input means having a small contact area, for example, a stylus, and therefore, such applications as to input letters become possible.

It is also possible to detect two contact points with high precision by applying a pulse signal sequentially to either the X electrodes XP or the Y electrodes YP and identifying from which electrode the signal comes in advance.

Though the invention by the present inventors is concretely described on the basis of the above described embodiments, the present invention is not limited to the above described embodiments and various modifications are, of course, possible as long as the gist of the invention is not deviated from.

What is claimed is:

1. A display device having a capacitance touch panel, characterized in that
    said capacitance touch panel comprises a number of X electrodes, a number of Y electrodes, and a number of Z electrodes,
    said X electrodes and said Y electrodes cross with a first insulating layer in between and are formed so that respective pad portions and fine wire portions are aligned alternately in the direction in which the electrodes extend, and thus, the pad portions of said X electrodes and the pad portions of said Y electrodes are aligned without overlapping as viewed in a plane,
    said Z electrodes are formed with a second insulating layer in between so that each Z electrode overlaps both an adjacent X electrode and Y electrode as viewed in a plane,
    said number of Z electrodes are electrically floating,
    a third insulating layer is formed over the Z electrodes, and
    a pulse signal is sequentially applied to one set of said X electrodes or Y electrodes and a change in the signal is detected from the other set of electrodes.

2. The display device according to claim 1, characterized in that the thickness of said second insulating layer changes when pressure is applied.

3. The display device according to claim 1, characterized in that said second insulating layer is formed of an elastic insulating material.

4. The display device according to claim 1, characterized in that
    the pad portion of a first X electrode extends to the vicinity of the fine wire portion of a second X electrode which is adjacent to the first X electrode,
    the pad portion of the first X electrode has such a form that the area is minimum in the vicinity of the fine wire portion of said second X electrode and the area is maximum in the vicinity of the fine wire portion of the first X electrode as viewed in a plane, and
    the area of the pad portion is smaller towards the vicinity of the fine wire portion of said second X electrode from the vicinity of the fine wire portion of the first X electrode.

5. The display device according to claim 1, characterized in that
    the pad portion of a first X electrode extends to the vicinity of the fine wire portion of two second X electrodes which are adjacent to the first X electrode,
    the form of the pad portion of said first X electrode is such that the width of the electrode is minimum in the vicinity of the fine wire portions of said two second X electrodes and the width of the electrode is maximum in the vicinity of the fine wire portion of the first X electrode as viewed in a plane,
    the form of the pad portions of said Y electrodes is such that the width in the direction in which said X electrodes extend is constant relative to the direction in which said Y electrodes extend as viewed in a plane, and
    the pad portions of said X electrodes and the pad portions of said Y electrodes are aligned alternatively in the direction in which said X electrodes extend as viewed in a plane.

6. The display device according to claim 1, characterized in that the form of the pad portions of said X electrodes is such that the pad portion is tapered towards an adjacent X electrode.

7. The display device according to claim 1, characterized in that the form of the pad portions of said X electrodes is such that the pad portion is tapered towards an adjacent X electrode and has a recess facing another adjacent X electrode.

8. The display device according to claim 1, characterized in that said Z electrodes are divided by a number of slits in the direction in which said X electrodes extend and divided by a number of slits in the direction in which said Y electrodes extend.

9. The display device according to claim 1, characterized in that said Z electrodes are divided by a number of slits in the direction in which said X electrodes extend, and the slits in said Z electrodes, which are in the direction in which said Y electrodes extend, are provided so that there is one slit in each Y electrode and one slit in each X electrode as viewed in a plane.

10. The display device according to claim 1, characterized in that said Z electrodes are divided by a number of slits in the direction in which said X electrodes extend, and the slits in said Z electrodes, which are in the direction in which said Y electrodes extend, are provided so that there is one slit in each Y electrode as viewed in a plane.

11. The display device according to claim 1, characterized in that said Z electrodes are divided by a number of slits in the direction in which said X electrodes extend, and the slits in said Z electrodes, which are in the direction in which said Y electrodes extend, are provided so that there is one slit in each X electrode as viewed in a plane.

12. A display device having a capacitance touch panel for detecting the coordinates of a touched point on the display region in a capacitance coupling system, characterized in that said capacitance touch panel comprises a number of X electrodes, a number of Y electrodes, and a Z electrode, said X electrode and said Y electrodes cross with a first insulating layer in between and are respectively formed such that pad portions and fine wire portions are alternately aligned in the direction in which the electrodes extend, and the pad portions of said X electrodes and the pad portions of said Y electrodes are arranged so as to not overlap as viewed in a plane, said Z electrode is formed with a second insulating layer in between so as to overlap both said number of X electrodes and said number of Y electrodes as viewed in a plane, said Z electrode is electrically floating, a third insulating layer is formed over the Z electrode, and a pulse signal is sequentially applied to one set of said X electrodes and said Y electrodes and a change in the signal from the other set of electrodes is detected.

13. The display device according to claim 12, characterized in that said Z electrode has a high resistance.

14. The display device according to claim 12, characterized in that said Z electrode is an electrode in a solid sheet form.

15. A display device having a capacitance touch panel for detecting the coordinates of a touched point on the display region in a capacitance coupling system, characterized in that said capacitance touch panel comprises a number of X electrodes, a number of Y electrodes, and a number of Z electrodes or one Z electrode, said X electrodes and said Y electrodes cross with a first insulating layer in between and are respectively formed so that pad portions and fine wire portions are alternately aligned in the direction in which the electrodes extend, and the pad portions of said X electrodes and the pad portions of said Y electrodes are arranged so as not to overlap as viewed in a plane, said Z electrodes or Z electrode are formed so as to overlap both said X electrodes and said Y electrodes with a second insulating layer in between as viewed in a plane, a third insulating layer is formed over said Z electrodes or Z electrode, said number of Z electrodes or one Z electrode is electrically floating, said second insulating layer is formed of a gas so that the volume changes when pressure is applied, and a pulse signal is sequentially applied to one set of said X electrodes and said Y electrodes and a change in the signal from the other set of electrodes is detected.

16. The display device according to claim 15, characterized in that said second insulating layer is air.

* * * * *